W. D. HESTER.
SPRING WHEEL.
APPLICATION FILED DEC. 16, 1910.
1,013,656.
Patented Jan. 2, 1912.
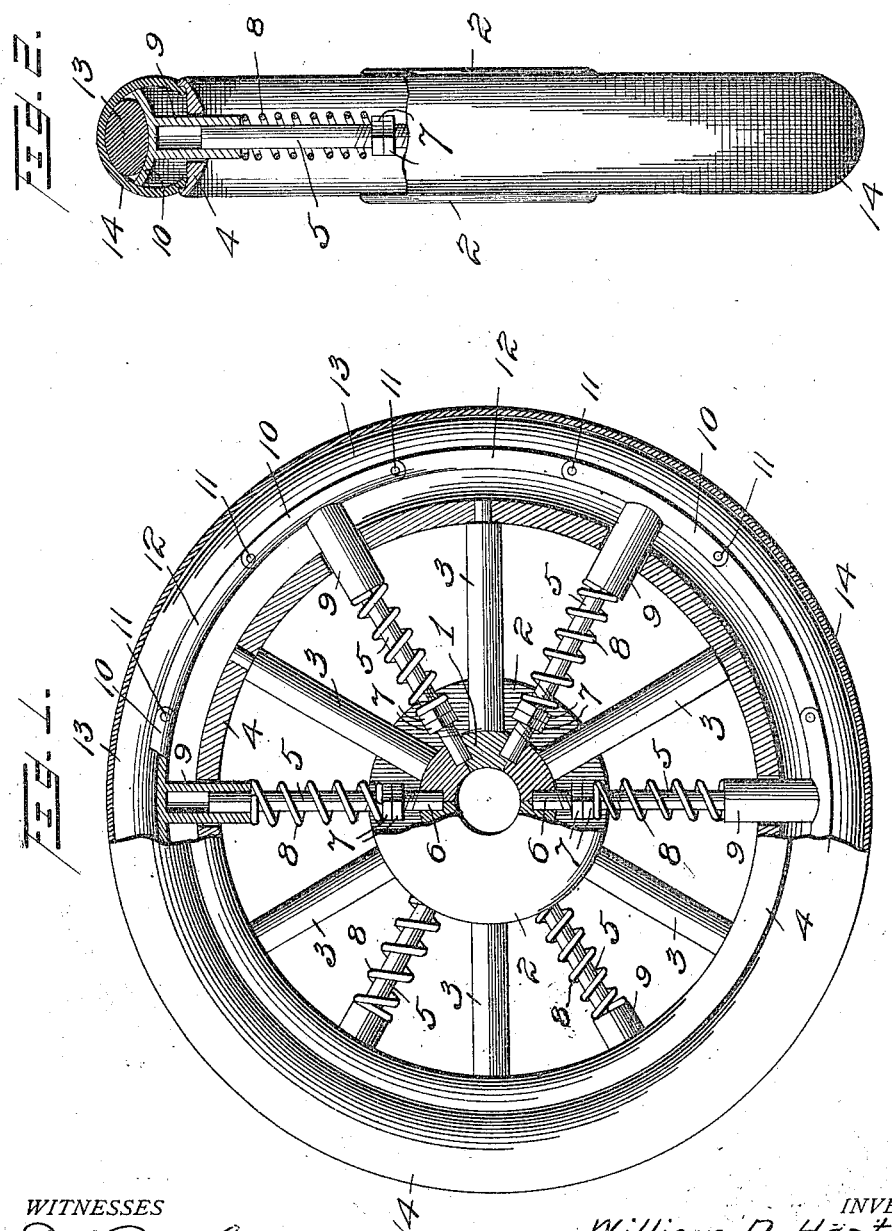
WITNESSES
INVENTOR:
William D. Hester,
by
Attorney.

UNITED STATES PATENT OFFICE.

WILLIAM D. HESTER, OF DURHAM, NORTH CAROLINA.

SPRING-WHEEL.

1,013,656.  Specification of Letters Patent.  Patented Jan. 2, 1912.

Application filed December 16, 1910. Serial No. 597,602.

*To all whom it may concern:*

Be it known that I, WILLIAM D. HESTER, a citizen of the United States, residing at Durham, in the county of Durham and State of North Carolina, have invented certain new and useful Improvements in Spring-Wheels, of which the following is a specification.

This invention relates to spring wheels and one of the principal objects of the same is to provide a simple, reliable and efficient means for absorbing the shocks and jars incident to automobiles or other vehicles when traveling over rough roads.

Another object of the invention is to provide a spring wheel to take the place of the ordinary wheels used on automobiles which are provided with pneumatic tires.

Still another object of my invention is to provide a spring wheel having a solid rubber tire in order that the expense and annoyance of punctured tires may be wholly dispensed with.

These and other objects may be attained by means of the construction illustrated in the accompanying drawing, in which:

Figure 1 is a side elevation and partial section of a spring wheel made in accordance with my invention; and Fig. 2 is an edge view and partial section of the same.

Referring to the drawing, the numeral 1 designates the hub of the wheel and 2 are the face plates for the opposite sides of the hub. The spokes 3, any suitable number of which may be used, are secured at their inner ends to the hub 1 while their outer ends are secured in any suitable manner to a metal rim 4. Secured to the hub 1 between the spokes 3 are metal pins 5, said pins being provided with threaded portions 6 for the accommodation of locking nuts 7. These nuts are designed for the purpose of adjusting the tension of the springs 8 which surround the pins 5 and for holding said springs in adjusted position. The outer ends of the pins 5 are mounted to slide in hollow sockets 9, said sockets being formed integral with the curved rim sections 10, said rim sections being pivoted as at 11 to intermediate rim sections 12 as shown more clearly in Fig. 1. A solid rubber tire 13 is mounted in the rim sections 10—12 and is held in place by means of a suitable cover 14, said cover being secured at its edges to the rim 4, as shown in Fig. 2.

It is to be noted that between each pair of spokes 3, the springs 8 are disposed and that the entire weight of the vehicle rests upon the solid rubber tire and compresses the springs 8. Any obstacle or projection on the road-way, if struck by the wheel, would not jar or shock the occupants of the vehicle owing to the resiliency of the springs 8.

From the foregoing, it will be obvious that a spring wheel made in accordance with my invention can be constructed at low cost, is strong, durable and efficient for its purpose, cannot become punctured, and will wear a comparatively long time without becoming injured or disabled.

I claim:

A spring wheel comprising a hub, a rigid metal rim, spokes connected to said hub and rim, a tire rim comprising curved sections pivotally connected together, studs projecting from some of said sections, said studs extending inwardly and adapted to move through holes in the rigid metal rim, said studs each having a bore or socket, a pin connected to the hub and mounted to move in said bore, and a spring surrounding said pin and bearing at one end against said stud, and lock nuts on said pin for adjusting the tension of said spring.

In testimony whereof I affix my signature in presence of two witnesses.

WILLIAM D. HESTER.

Witnesses:
 L. G. COLE,
 W. J. LUNSFORD.